(12) United States Patent
Jung et al.

(10) Patent No.: US 9,720,269 B2
(45) Date of Patent: Aug. 1, 2017

(54) DISPLAY DEVICE

(71) Applicant: LG ELECTRONICS INC., Seoul (KR)

(72) Inventors: Gilsik Jung, Pyeongtaek-si (KR);
Munhe Lee, Pyeongtaek-si (KR);
Jinbum Lee, Pyeongtaek-si (KR);
Moonhong Choi, Pyeongtaek-si (KR);
Jaemin Hyun, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/957,934

(22) Filed: Aug. 2, 2013

(65) Prior Publication Data
US 2014/0233259 A1 Aug. 21, 2014

(30) Foreign Application Priority Data
Feb. 21, 2013 (KR) .......................... 10-2013-0018680

(51) Int. Cl.
F21V 7/04 (2006.01)
G02F 1/1333 (2006.01)
F21V 8/00 (2006.01)

(52) U.S. Cl.
CPC ..... *G02F 1/133308* (2013.01); *G02B 6/0088* (2013.01); *G02F 2001/13332* (2013.01); *G02F 2001/133314* (2013.01); *G02F 2202/22* (2013.01)

(58) Field of Classification Search
CPC ............ F21V 2008/006; G02B 6/0081; G02B 6/008; G02F 1/133308; G02F 2001/133314; G02F 2001/01332
USPC ........................................................ 362/607
See application file for complete search history.

(56) References Cited

U.S. PATENT DOCUMENTS

| 8,303,157 | B2 * | 11/2012 | Yang et al. .................... 362/633 |
| 8,638,406 | B2 * | 1/2014 | Liang .............................. 349/58 |
| 2004/0257515 | A1 | 12/2004 | Lee | |
| 2005/0180168 | A1 | 8/2005 | Chun et al. | |
| 2006/0193148 | A1 * | 8/2006 | Bang ............................. 362/607 |

(Continued)

FOREIGN PATENT DOCUMENTS

| CN | 101115359 A | 1/2008 |
| CN | 101119616 A | 2/2008 |
| CN | 101153979 A | 4/2008 |

(Continued)

*Primary Examiner* — Anh Mai
*Assistant Examiner* — Matthew Peerce
(74) *Attorney, Agent, or Firm* — Birch, Stewart, Kolasch & Birch, LLP (57) ABSTRACT

A display device includes a display module configured to output image information, a front case configured to cover a front edge portion of the display module, with an opening formed in a central portion, and a rear case coupled to the front case to cover a back side of the display module, with a rib projected therefrom to support the back side of the display module. The display module includes a display panel, a light guide unit arranged on the back side of the display panel, a back cover configured to cover the first lateral side of the light guide unit and a predetermined portion of the back side of the light guide unit, and a light source coupled to the back cover. The display device may reduce the material cost and the overall weight by omitting a metallic top cover and reducing the size of the back cover.

15 Claims, 8 Drawing Sheets

(56) References Cited

U.S. PATENT DOCUMENTS

| | | | |
|---|---|---|---|
| 2008/0025005 A1* | 1/2008 | Yeh et al. ................. | 361/752 |
| 2008/0030112 A1 | 2/2008 | Lee et al. | |
| 2008/0074903 A1 | 3/2008 | Nam et al. | |
| 2008/0089018 A1* | 4/2008 | Kim et al. ................. | 361/681 |
| 2008/0211989 A1* | 9/2008 | Park .......................... | 349/64 |
| 2008/0252808 A1* | 10/2008 | Chang ........................ | 349/58 |
| 2009/0128741 A1* | 5/2009 | Peng et al. ................. | 349/67 |
| 2009/0237588 A1* | 9/2009 | Takenaka ........... | G02F 1/133308 |
| | | | 349/58 |
| 2010/0208161 A1* | 8/2010 | Sasaki et al. ............... | 349/58 |
| 2010/0328568 A1* | 12/2010 | Lee et al. ................... | 349/58 |
| 2011/0304792 A1* | 12/2011 | Lee et al. ................... | 349/58 |
| 2012/0099341 A1 | 4/2012 | Kwon et al. | |
| 2012/0320629 A1* | 12/2012 | Lim et al. .................. | 362/609 |
| 2013/0003283 A1* | 1/2013 | Sakamoto .......... | G02F 1/133308 |
| | | | 361/679.21 |
| 2014/0036531 A1* | 2/2014 | Kim et al. ................. | 362/607 |
| 2014/0055703 A1* | 2/2014 | Gu et al. .................... | 349/58 |
| 2014/0104873 A1* | 4/2014 | Yu et al. .................... | 362/607 |
| 2014/0111743 A1* | 4/2014 | Takemura et al. ......... | 349/64 |
| 2014/0204275 A1* | 7/2014 | Shimizu ..................... | 348/725 |
| 2014/0320747 A1* | 10/2014 | Kamada ..................... | 348/725 |

FOREIGN PATENT DOCUMENTS

| | | |
|---|---|---|
| CN | 201278240 Y | 7/2009 |
| CN | 102352990 A | 2/2012 |
| CN | 102454926 A | 5/2012 |
| EP | 2196984 A1 | 6/2010 |
| KR | 10-2004-0061119 A | 7/2004 |
| KR | 10-2005-0082211 A | 8/2005 |
| WO | WO 2009/044499 A1 | 4/2009 |

\* cited by examiner

DISPLAY DEVICE

Pursuant to 35 U.S.C. §119(a), this application claims the benefit of earlier filing date and right of priority to Korean Application No. 10-2013-0018680, filed on Feb. 21, 2013, the contents of which are hereby incorporated by reference herein in their entirety.

BACKGROUND OF THE DISCLOSURE

Field of the Disclosure

The present invention relates to a light display device with a relatively low price that has no top cover formed of a metallic material to reduce an overall weight.

Discussion of the Related Art

Recently, various flat panel display devices capable of reducing the weight that is a disadvantage of a cathode ray tube have received attention. Examples of such flat panel display devices include liquid crystal displays, field emission displays, plasma display panels and electro-luminescence devices.

A display device is a device configured to output an image on a screen according to an image signal and such display device is used in various devices including a monitor and a television. A display module provided in a conventional display device is configured of metallic front and rear covers to secure various film materials including a display panel and a light guide film to front and back sides of the display device.

However, the number of parts formed of metallic materials is increased and the weight of the display device is increased accordingly. The conventional display device has a disadvantage of the high production cost per unit.

SUMMARY OF THE DISCLOSURE

An object of the present invention is to provide a light display device with a relatively low price that has no top cover formed of a metallic material to reduce an overall weight.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device includes a display module configured to output image information according to an image signal to a screen: a front case configured to cover a front edge portion of the display module; and a rear case coupled to the front case to cover a back side of the display module, with a rib projected there from to support the back side of the display module, wherein the display module includes a display panel configured to adjust a transparency degree and a color per pixel unit based on the image signal transmitted thereto; a light guide unit arranged on the back side of the display panel to supply lights transmitted from a first lateral side to the display panel arranged in front; a back cover configured to cover the first lateral side of the light guide unit and a predetermined portion of the back side of the light guide unit; and a light source coupled to the back cover to supply lights to the first lateral side of the light guide unit.

The display module may further include a driving circuit connected to the display panel via a flexible printed circuit board and disposed on back sides of the back cover and the light guide unit.

The driving circuit may be connected to a second side of the display panel via the flexible printed circuit board and the second side is different side to a first side where the light source is arranged.

The rib may be omitted in a predetermined portion of the rear case where the driving circuit is arranged.

The display device may further include a conductive gasket provided in the front case, to be in contact with the display panel, wherein an end of the conductive gasket may be extended toward the back side of the display module to contact with the back cover.

The display module may further include a panel guide arranged an edge portion between the display panel and the light guide unit to guide a disposing position of the light guide unit.

The panel guide may include at least one of a lateral wall configured to cover a lateral side of the light guide unit and a guide projection inserted in a guide hole formed in the film material.

The rib having a lattice shape or honeycomb shape may be formed in an overall portion of the rear case.

A portion of the rib where the back cover may be arranged is lower than the other portion of the rib.

The front case may further include a hook projected from an edge portion of the back side to be coupled to an edge portion of the back side of the display module.

The hook may be hooked to a portion of the back side of the display module where the driving circuit or the flexible printed circuit is not formed.

The light guide unit may include a light guide plate having a first lateral side where the light source is arranged and the light guide plate configured to diffuse a light incident from the light source in a lateral direction; a reflection film disposed on a back side of the light guide plate to reflect the light forward; and a diffusion film disposed on a front side of the light guide plate to uniformly diffuse the light forward.

The light guide unit may further include a prism sheet configured to refract and concentrate lights on a front side of the diffusion sheet to enhance brightness.

The display device includes no metallic top cover and the size of the back cover provided in the display device is reduced. Accordingly, the material cost can be reduced and the overall weight of the display device can be reduced as well.

Furthermore, the supporting structures are added to the front case and the rear case, respectively, to reinforce the force for coupling the display module. Accordingly, a problem of a weakened coupling force generated by omitting the auxiliary material may be solved.

Still further, the conductive gasket may be provided in the portion that is subject to the static electricity such that it may cut off and bypass the static electricity only to enhance the durability of the display device.

It is to be understood that both the foregoing general description and the following detailed description of the embodiments or arrangements are exemplary and explanatory and are intended to provide further explanation of the embodiments as claimed.

DESCRIPTION OF SPECIFIC EMBODIMENTS

It will be understood that when an element is referred to as being 'on' or 'under' another element, it can be directly on/under the element, and one or more intervening elements may also be present.

Figure 1:
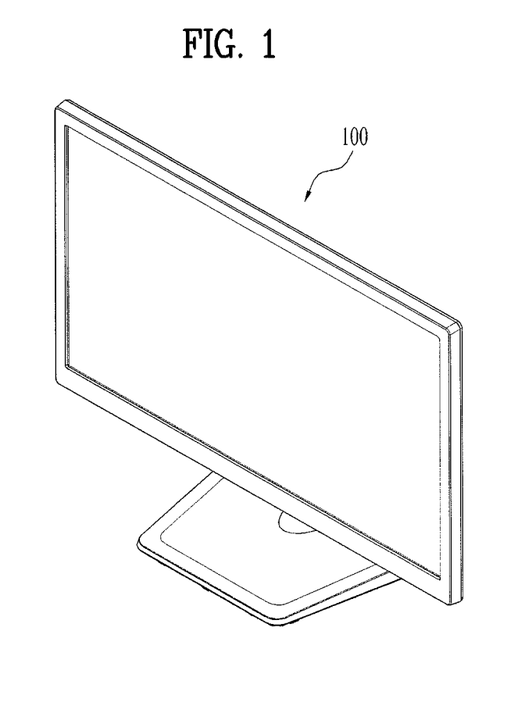
FIG. 1 is a perspective diagram illustrating a display device according to one embodiment.
Figure 2:
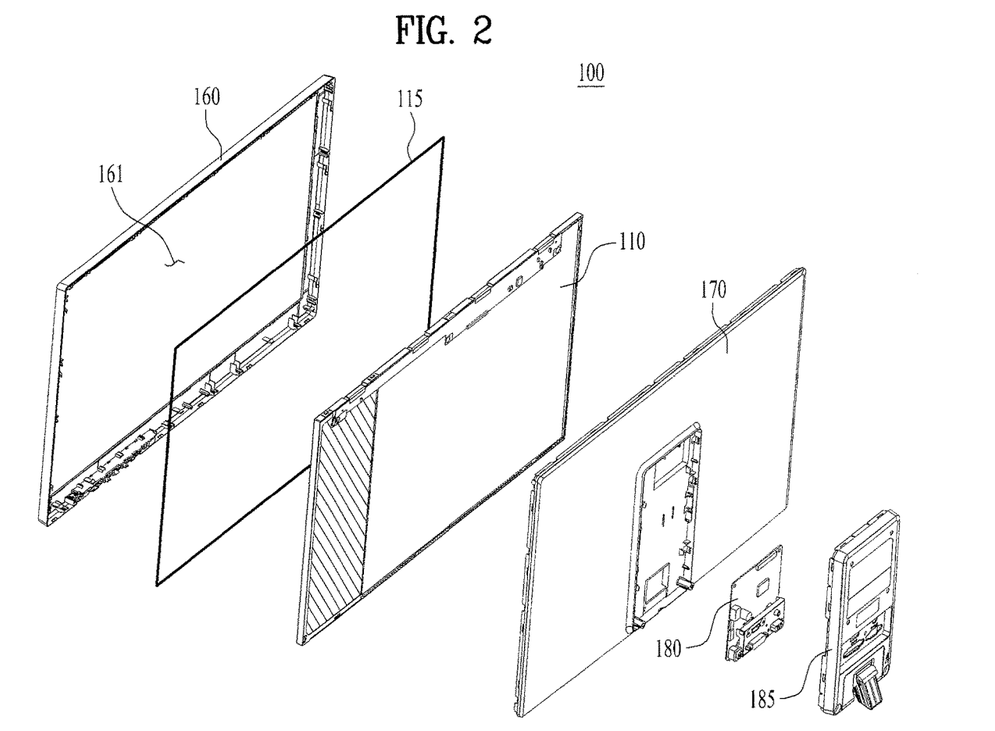
FIG. 2 is an exploded perspective diagram of the display device according to the embodiment.

FIG. 1 is a perspective diagram illustrating a display device 100 according to one embodiment. FIG. 2 is an exploded perspective diagram of the display device according to the embodiment. In the drawings, a stand type display device 100 is shown. However, a wall mount type display device 100 may be applied to the embodiment.

The display device 100 includes a display module 110 configured to output an image on a screen according to an image signal and a case 160 and 170 configured to load the display module 110. The case consists of a front case 160 configured to cover a front edge area of the display module 110, with an opening 161 for exposing the display module 110 there through, and a rear case 170 configured to cover a back side of the display module.

A main printed circuit board 180 functioned to receive an image signal from an external device and the electric power may be arranged on a back side of the display module 110. An auxiliary PCB cover 185 may be further provided to install the main printed circuit board 110 and a protection cover 115 may be further provided in a front side of the display module to protect the display module 110.

Figure 3:
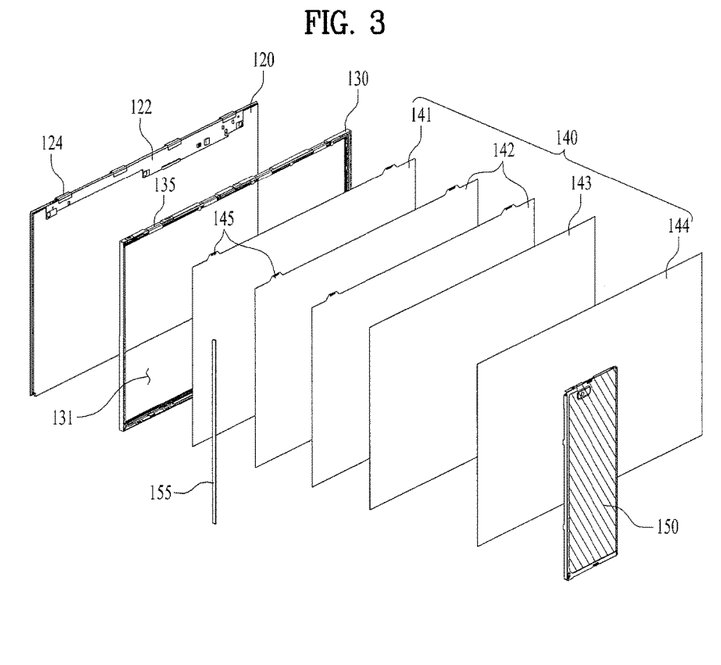
FIG. 3 is an exploded perspective diagram of a display module provided in the display device.

FIG. 3 is an exploded perspective diagram of a display module provided in the display device. The display module 110 is a device configured to output image information to a screen according to the image signal and it includes a display panel 120, a light guide unit 140, a back cover 150 and a light source 155.

The display panel 120 receives the image signal and adjusts a transparency and a color per pixel unit. The display panel 120 applies electric currents to pixel units to constitute an overall image and it has one side (or a second side) connected to a driving circuit 122 configured to control the current of each pixel. A flexible material is used in the connection between the driving circuit 122 and the display panel 120 and the flexible material may be a flexible printed circuit board 124, such that the position of the driving circuit 122 may have a high freedom degree.

In the embodiment, the driving circuit 122 is connected to the second end of the display panel via the flexible printed circuit board 124. As shown in FIG. 2, after the display module 110 is assembled, the driving circuit 122 may be arranged behind the display module 110.

The image signal may be provided to the display panel 120 by the main printed circuit board 180. The image signal may be received via wireless communication, broadcasting communication or an external image input terminal. The main printed circuit board 180 transmits the received image signal to the driving circuit 1222 of the display panel 120. The driving circuit 122 applies electric currents to each of the pixels arranged in the display panel 120 according to the image signal to adjust a transparency and a color for each pixel, such that it may output the image having the pixels with the adjusted transparency and color.

The light guide unit 140 may be arranged in the back side of the display panel 120 to be provided with light from the light source 155 arranged in a first side of the display panel 120. After that, the light guide unit 140 provides the lights transmitted from the first side to the display panel 120 positioned in front uniformly. The light guide unit 140 may consist of a light guide plate 143, a reflection film 144, a diffusion film 142 and a prism sheet 141.

The light source 155 for supplying lights may be arranged in a first side of the light guide plate 143 and it diffuses the lights incident thereon from the light source 155 in the reverse direction. Then, the lights travel in the reverse direction along the light guide plate 143 and some of the lights collided against the reflection film 144 disposed behind to be re-reflected forwardly. The lights emitted forwardly pass the diffusion film 142 and the prism film to be provided to the display panel 120.

The reflection film 144 reflects the lights forwardly and the diffusion film 142 diffuses the lights to provide the lights emitted from the light guide plate 143 to a front side of the display panel as uniform surface light sources 155. The prism sheet 141 is disposed on a front side of the diffusion film 142 and it refracts and concentrates the lights emitted from the diffusion film 142 to enhance brightness.

The display module 110 may further include a panel guide 130 disposed between the display panel 120 and the light guide unit 140. The panel guide 130 guides a plurality of films and a plate-shaped material that compose the light guide unit 140 to be disposed sequentially and to prevent the layers from moving after being multilayered.

As shown in FIG. 3, the panel guide 130 is positioned between the display panel 120 and the light guide unit 140. An opening 134 is formed in a central portion of the panel guide 130 to provide the lights to the display panel 120.

Figure 4:
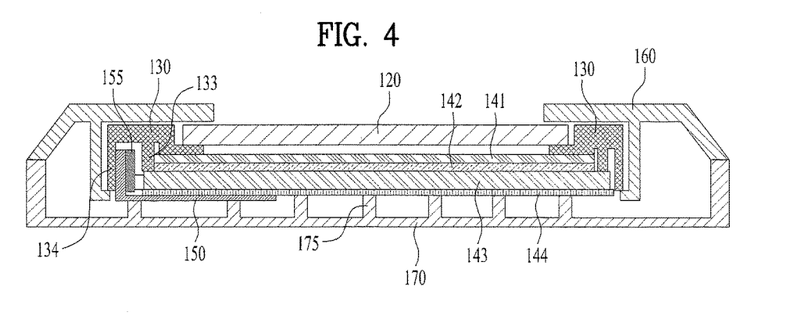
FIG. 4 is a side sectional diagram of the display device.
Figure 5:
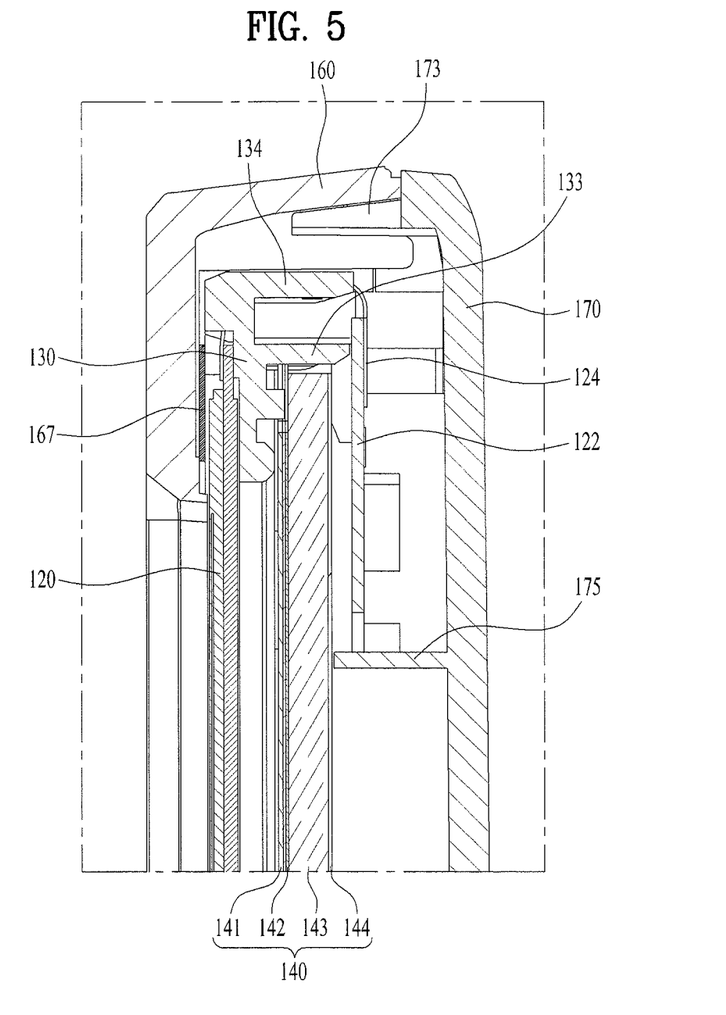
FIG. 5 is a longitudinal sectional diagram of the display device.

FIG. 4 is a side sectional diagram of the display device. FIG. 5 is a longitudinal sectional diagram of the display device. Referring to FIGS. 4 and 5, the panel guide 130 may include lateral walls 133 and 134 covering an edge of the light guide unit 140. In a predetermined space defined by the lateral walls 133 and 134 may be disposed the prism sheet 141, the diffusion film 142, the light guide plate 143 and the reflection film 144 which consist of the light guide unit 140.

One lateral wall may cover lateral sides of the layers composing the light guide unit 140. Alternatively, as shown in FIGS. 4 and 5, two or more layers may be formed. A lateral wall 133 arranged in an inner position may cover lateral sides of the prism sheet 141 and the diffusion film 142 disposed on the front side of the light guide plate 143. A lateral wall 134 arranged in an outer position may cover lateral sides of the light guide plate 143, the reflection film 144 and the back cover 150.

Rather than the lateral walls 133 and 134, a guide projection 135 may be further provided to guide the disposing of the layers. The guide projection 135 may be inserted in at least predetermined layers of the light guide unit 140, such that the light guide unit 140 may be guided to be disposed in an appropriate position.

The light guide plate 143 is relatively thicker than the other layers and it is not easy to form the hole 145 in the light guide plate 143. In this instance, the guide hole 145 may be formed only between the prism sheet 141 and the diffusion film 142.

Different from the embodiment, a guide projection 135 is formed in at least predetermined layers of the light guide unit 140 and a groove or hole is formed in an edge area of the panel guide 130, such that the guide projection 135 of the light guide unit 140 may be inserted in the groove or hole to guide the layers of the light guide unit 140 to be disposed in precise positions.

The back cover 150 may be formed of a metallic material and examples of such a metallic material include SUS. The back cover 150 may cover a first lateral side of the light guide unit 140 and a predetermined portion of the back side of the light guide unit 140. The back cover 150 is configured to position the light source 155 in a lateral side of the light guide unit 140 and to support a predetermined area of the back side of the light guide unit 140.

A conventional back cover covers an overall area of the back side of the light guide unit to support the light guide unit and to protect the display panel when a static electricity flows in the display device from outside. In addition, the back cover is configured to radiate the heat generated from the light source.

However, the conventional back cover 150 is formed of a metallic material and the metallic back cover is the reason of heightening the production price of the display device 100 and also the reason of the increased weight of the display device 100. According to this embodiment, the production cost can be reduced and the weight of the display device 100 can be reduced only to enhance user convenience.

The back cover 150 according to the embodiment may be extended from the light source as far as a desired size necessary to radiate the heat generated from the light source, such that the size of the back cover 150 can be smaller than that of the conventional back cover.

The back cover 150 according to this embodiment is partially covering the light guide unit 140 and the force possessed by the back cover 150 to support the light guide unit 140 may be insufficient such that the light guide unit 140 may fail to closely contact with the display panel 120. To compensate the gap between the light guide unit 140 and the display panel 120, the rear case 170 may include a rib 175.

Referring to FIGS. 4 and 5, the rib 175 is projected inward with respect to the rear case 170 and it supports the light guide unit 140 in a forward direction such that the light guide unit 140 may closely contact with the display panel 120.

The rib 175 has to support the overall back side of the light guide unit 140 for each film of the light guide unit 140 not to be distant from the display panel 120, not supporting only a predetermined portion of the light guide unit 140.

Figure 6:
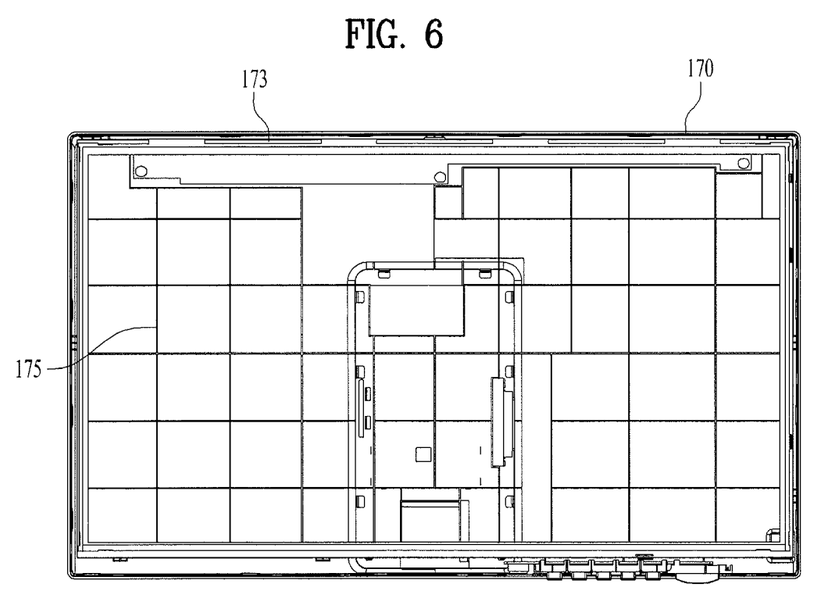
FIG. 6 is a front view illustrating an inner lateral side of a rear case provided in the display device.

Accordingly, the rib 175 may be configured of a honeycomb structure or other structures. In such a honeycomb structure, lattice-shaped or a plurality of hexagonal cylinders arranged in an overall area of the rear case 170 in vertical/horizontal directions, spaced apart a predetermined distance from each other. FIG. 6 is a front view illustrating an inner lateral side of a rear case provided in the display device. In FIG. 6, a lattice-shaped rib 175 is shown.

The rib 175 formed dense in the lattice-shape or honeycomb shape may not be provided in a portion where the driving circuit 122 can be omitted at a portion where the driving circuit 122 is positioned. A force is applied to the driving circuit 122 by the rib 175 and damage to the driving circuit 122 may be prevented. In other words, a regular shape such as the lattice shape is basic and the position of the rib 175 may be partially variable according to the arrangement of the inner parts.

In addition, the rib (a left rib of FIG. 4) supporting the back side of the back cover 150 is relatively lower than the rib supporting the other portion, so as to compensate a difference between the thickness of the portion where the back side is covered by the back cover and the thickness of the other portion.

According to the embodiment, to reduce the weight of the display device 100 and the production cost, the conventional metallic cover for covering the front edge portion of the conventional display device 110 may be omitted and the display module 110 may be coupled to the front case 160 directly.

Figure 7:
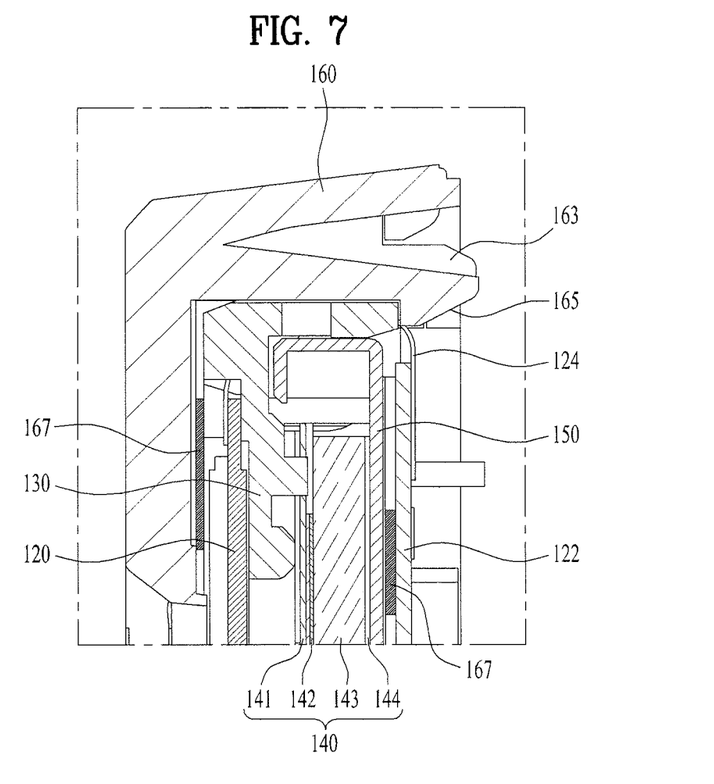
FIG. 7 is a side sectional diagram illustrating a front case and a display module according to one embodiment that are provided in the display device.

Instead of omitting the top cover, the front case 160 according to the embodiment may have a hook 165 directly hooked to a back side edge area of the display module 110 as shown in FIG. 7 to secure the display module 110. The hook 165 is employed to fix each of materials composing the display module 110 to the front case 160, such that each of the materials may not come off from each other from the front case 160. A plurality of hooks 165 may be arranged along an edge area of the front case 160, spaced apart a predetermined distance from each other.

The front case 160 is coupled to the rear case 170, with securing the display module 120. For the coupling of the front case 160 and the rear case 170, structures 163 and 173 may be provided in the front case 160 and the rear case 170, respectively, as shown in FIGS. 5 and 7.

At this time, the hooks 165 may be arranged without overlapped with the driving circuit 122 and the flexible printed circuit board 124 connecting the driving circuit 122 and the display panel 120 with each other. If a signal is short-cut by damage to the flexible printed circuit board 124 and the driving circuit 122 generated by the hooks 165, there might be a poor product.

Figure 8:
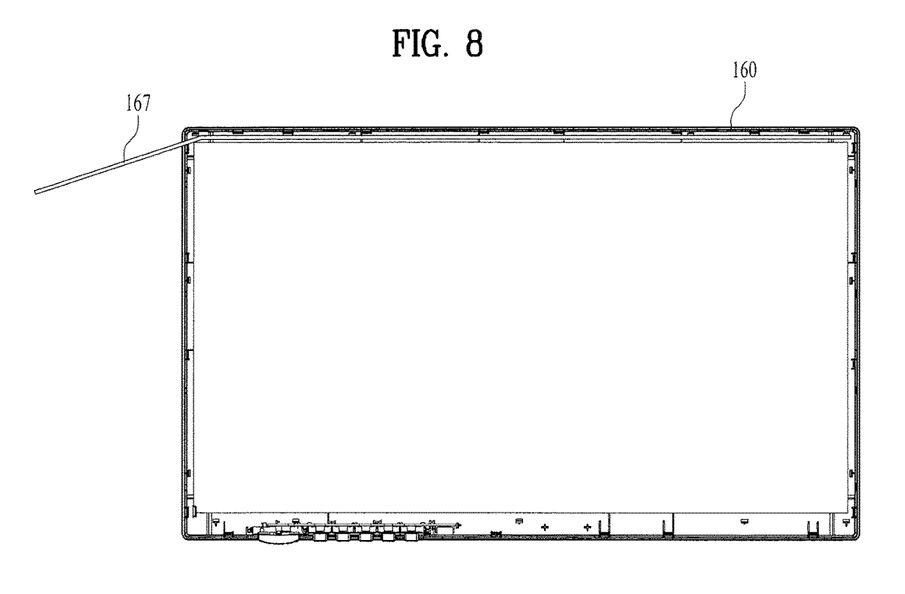
FIG. 8 is a rear view illustrating the front case according to the embodiment that is provided in the display device.

As shown in FIG. 8, a conductive gasket 167 may be further provided in an inner end of the front case 160. The conductive gasket 167 may be a conductive material mixed with a flexible material to flow electricity therein. Examples of such a flexible material include silicon and rubber.

Figure 9:
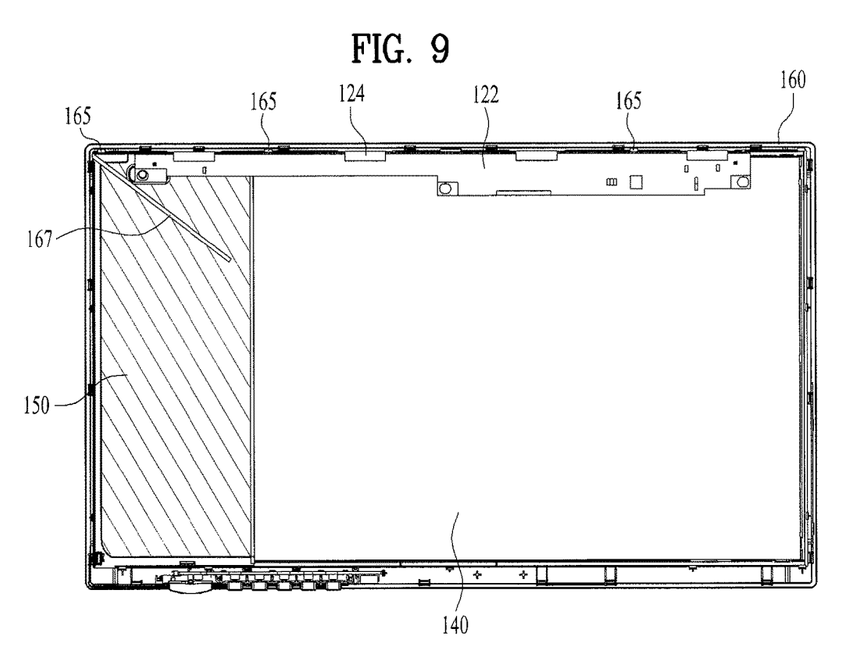
FIG. 9 is a rear view illustrating the front case and the display module according to the embodiment that are provided in the display device.

The conductive gasket 167 is extended longer than the size of the front case 160, to be bent to the back side of the display module 110. In other words, as shown in FIG. 9, each of the layers composing the display module 110 is disposed and the conductive gasket 167 is bent toward the back side of the display module 110 to contact with the back cover 150.

The static electricity drawn into the display device 110 is caught by the conductive gasket 167 to move to the back cover 150 along the conductive gasket 167, such that the static electricity may be discharged, without applied to the display panel 120 or the driving circuit.

The conductive gasket 167 may be formed in an entire edge portion of the display device 100 or it may be formed in the second side portion of the display device 100 that is connected to the driving circuit 122 to cut off the static electricity applied to the driving circuit 122 and the flexible printed circuit board 124 that are subject to the static electricity. The static electricity cut off by the conventional top cover formed of the metallic material is cut off by the conductive gasket 167 according to the embodiment. Accordingly, even when no top cover is provided, the ability and performance of the display device 100 cannot be deteriorated.

According to the embodiment described above, the display device 100 includes no metallic top cover and the size of the back cover 150 provided in the display device 100 is reduced. Accordingly, the material cost can be reduced and the overall weight of the display device can be reduced as well.

Furthermore, the supporting structures are added to the front case 160 and the rear case 170, respectively, to reinforce the force for coupling the display module 110. Accordingly, a problem of a weakened coupling force generated by omitting the auxiliary material may be solved.

Still further, the conductive gasket 167 may be provided in the portion that is subject to the static electricity such that it may cut off and bypass the static electricity only to enhance the durability of the display device.

Although embodiments have been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a display panel;
a light guide plate located at a back side of the display panel;
a light source arranged in a first side of the light guide plate and supplying light to the display panel via the light guide plate;
a diffusion film located at a front side of the light guide plate to diffuse the light to the display panel;
a reflection film located at a back side of the light guide plate to reflect the light;
a back cover radiating heat generated from the light source, the back cover comprising:
a side portion covering a portion of a lateral side of the light source; and
a rear portion provided at a first end edge of the side portion and contacting a first back side portion of the reflection film;
a rear case covering a back side of the reflection film and a back side of the back cover and provided in a rear side of the display device;
a front case coupled to the rear case and provided in a front side of the display device; and
a support rib projected from the rear case to radiate heat generated from the light source, the support rib comprising:
a first rib element contacting a second back side of the reflection film, wherein the second back side portion of the reflection film is a region excepting the first back side of the reflection film among an entire back side of the reflection film; and
a second rib element contacting the rear portion of the back cover.

2. The display device according to claim 1, further comprising:
a driving circuit connected to the display panel via a flexible printed circuit board, the driving circuit including:
a first portion located adjacent to the rear portion of the back cover, and
a second portion located adjacent to the back side of the reflection film.

3. The display device according to claim 2, wherein the light source is located along a first side of the display panel, and the driving circuit is located along a second side of the display panel via the flexible printed circuit board.

4. The display device according to claim 2, wherein the support rib is located at the rear case at a location other than a portion of the rear case where the driving circuit is arranged.

5. The display device according to claim 1, further comprising:
a conductive gasket provided in the front case, the conductive gasket contacting the display panel,
wherein one end of the conductive gasket extends toward the back side of the reflection film to contact the back cover.

6. The display device according to claim 1, further comprising:
a panel guide arranged along an edge portion of the display panel, the panel guide having a portion located between the display panel and the diffusion film to guide a positioning of a light guide unit comprising the light guide plate, the reflection film and the diffusion film.

7. The display device according to claim 6, wherein the panel guide comprises a lateral wall covering a lateral side of the light guide unit.

8. The display device according to claim 6, wherein the panel guide comprises a guide projection inserted into a guide hole formed in the light guide unit.

9. The display device according to claim 1, wherein the support rib comprises a plurality of intersecting rib elements arranged in a grid pattern over a majority portion of the rear case.

10. The display device according to claim 1, wherein the support rib comprises a plurality of rib elements arranged in a honeycomb pattern over a majority portion of the rear case.

11. The display device according to claim 1, wherein the front case comprises a hook projected from an edge portion of the front case, the hook being coupled to an edge portion of the back side of the reflection film, and the display device further comprises:
a driving circuit connected to the display panel via a flexible printed circuit board, and
wherein the hook portion is coupled to a portion of the back side of the reflection film at a location where the driving circuit and the flexible printed circuit are not located.

12. The display device according to claim 1, further comprising a prism sheet refracting and concentrating light on a front side of the diffusion film to enhance brightness.

13. The display device according to claim 1, wherein the back cover is made of metal and covers less than a majority of the back side of the display module.

14. The display device according to claim 1, wherein a length of the first rib element is longer than a length of the second rib element.

15. A display device comprising:

a display panel;

a panel guide arranged along an edge portion of the display panel;

a light guide plate located at a back side of the display panel;

a light source arranged in a first side of the light guide plate and supplying light to the display panel via the light guide plate;

a diffusion film located at a front side of the light guide plate to diffuse the light to the display panel;

a reflection film located at a back side of the light guide plate to reflect the light;

a back cover radiating heat generated from the light source, the back cover comprising:
- a side portion covering a portion of a lateral side of the light source; and
- a rear portion provided at a first end edge of the side portion and contacting a first back side portion of the reflection film;

a rear case covering a back side of the reflection film and a back side of the back cover and provided in a rear side of the display device;

a front case coupled to the rear case and provided in a front side of the display device; and a support rib projected from the rear case to radiate heat generated from the light source, the support rib comprising:
- a first rib element contacting a second back side of the reflection film, wherein the second back side portion of the reflection film is a region excepting the first back side of the reflection film among an entire back side of the reflection film; and
- a second rib element contacting the rear portion of the back cover, wherein the front case directly covers a front edge portion of the display panel, and wherein the front case has a hook covering a side portion and an edge portion of a back side of the display panel and holding the display panel.

\* \* \* \* \*